US012357126B2

(12) United States Patent
Jeong et al.

(10) Patent No.: US 12,357,126 B2
(45) Date of Patent: Jul. 15, 2025

(54) BLENDER

(71) Applicant: LG ELECTRONICS INC., Seoul (KR)

(72) Inventors: Jeonghoon Jeong, Seoul (KR); Jeahyuk Wie, Seoul (KR); Hyunwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 738 days.

(21) Appl. No.: 17/638,129

(22) PCT Filed: Aug. 5, 2020

(86) PCT No.: PCT/KR2020/010326
§ 371 (c)(1),
(2) Date: Feb. 24, 2022

(87) PCT Pub. No.: WO2021/040259
PCT Pub. Date: Mar. 4, 2021

(65) Prior Publication Data
US 2022/0361716 A1 Nov. 17, 2022

(30) Foreign Application Priority Data
Aug. 29, 2019 (KR) .................. 10-2019-0106699

(51) Int. Cl.
*A47J 43/046* (2006.01)
*A47J 43/07* (2006.01)
(52) U.S. Cl.
CPC ......... *A47J 43/046* (2013.01); *A47J 43/0727* (2013.01); *A47J 43/0761* (2013.01)

(58) Field of Classification Search
CPC ... A47J 43/046; A47J 43/0727; A47J 43/0761
(Continued)

(56) References Cited

U.S. PATENT DOCUMENTS 5,360,176 A * 11/1994 Mugge .................. A47J 43/046
241/282.1
2005/0194484 A1 9/2005 Starr
(Continued)

FOREIGN PATENT DOCUMENTS

CN 100508855 C 7/2009
CN 104812279 A 7/2015
(Continued)

*Primary Examiner* — David L Sorkin
(74) *Attorney, Agent, or Firm* — Bryan Cave Leighton Paisner LLP

(57) ABSTRACT

The present invention relates to a blender. The blender includes: a body provided with a motor assembly; a container which is detachably mounted to the body and in which food is accommodated; a container seating portion which is provided on a top surface of the body and on which the container is seated; a body accommodation portion which is recessed in a bottom surface of the container so that the container seating portion is inserted, and is in close contact with the container seating portion when the container is seated to fix the container; and an air vent which passes through a lower end of the container and communicates with the body accommodation portion, and through which air enters and exits the body accommodation portion when the container is mounted on the body.

12 Claims, 12 Drawing Sheets

(58) Field of Classification Search
USPC .................................................. 366/205, 314
See application file for complete search history.

(56) References Cited

U.S. PATENT DOCUMENTS

| | | | |
|---|---|---|---|
| 2008/0212403 A1* | 9/2008 | Garman | A47J 43/0727 366/205 |
| 2015/0044344 A1* | 2/2015 | Choi | A47J 43/0727 426/519 |
| 2015/0289723 A1 | 10/2015 | Rojas Restrepo et al. | |
| 2016/0015217 A1 | 1/2016 | Rojas Restrepo et al. | |
| 2017/0273508 A1 | 9/2017 | Kim | |

FOREIGN PATENT DOCUMENTS

| | | |
|---|---|---|
| EP | 2937027 B1 | 3/2017 |
| JP | 2003-230491 A | 8/2003 |
| KR | 10-0895708 B1 | 4/2009 |
| KR | 10-1384979 B1 | 4/2014 |
| KR | 101448681 B1 | 10/2014 |
| KR | 10-1943098 B1 | 1/2019 |
| WO | 2014/071994 A1 | 5/2014 |

\* cited by examiner

BLENDER

This application is a National Stage Application of International Application No. PCT/KR2020/010326, filed on Aug. 5, 2020, which claims the benefit of and priority to Korean Patent Application No. 10-2019-0106699, filed on Aug. 29, 2019, which are hereby incorporated by reference in their entirety for all purposes as if fully set forth herein.

TECHNICAL FIELD

The present disclosure relates to a blender.

BACKGROUND

In general, a blender is a home appliance that cuts food contained in a container by a blade rotated by an electric motor, crushes food into powder, or makes food into a liquid-like state, and is also commonly referred to as a blender.

In a general blender, a container is seated on a top surface of a body in which a motor is embedded, and when the container is seated, a blade inside the container is connected to a rotation shaft of the motor to be in a rotatable state. In addition, the user may drive the motor by manipulating the body after putting the food in the container, and the blade may rotate by the driving of the motor to crush the food.

Such a blender has recently been developed as a large-capacity blender with a large container, and also, a blender using a motor rotating at a high speed to more effectively crush various foods is being developed.

In addition, the blender may have various manipulation structures to facilitate the crushing operation of various foods.

In International Patent Publication WO/2014/071994, a recessed connection portion is formed in a bottom of a container, and a protrusion portion is formed on a top surface of a body, so that when the container is seated on the body, the protrusion portion is inserted into the connection portion, thereby allowing the container to be firmly fixed to the body. Even if the motor operates at a high speed in this state, the container may maintain a stably mounted state.

However, in the blender having such a structure, it is difficult to separate and couple the container having a close contact structure between the connection portion and the protrusion portion.

That is, the connection portion and the protrusion portion are completely in close contact with each other. Thus, when the container is being separated, because a space between the container and the body is sealed, the container and the body are not easily separated from each other.

Particularly, in the process of separating the container, the body may move along with the container, and accident or injury to the user may be caused by an unexpected falling of the body.

DISCLOSURE

Technical Problem

An embodiment of the present disclosure aims to provide a blender in which the container is easily seated and separated.

An embodiment of the present disclosure aims to provide a blender that is easy to detach from a container while maintaining the binding force of the container.

Technical Solution

A blender according to an embodiment of the present disclosure may include: a body provided with a motor assembly; a container which is detachably mounted to the body and in which food is accommodated; a container seating portion which is provided on a top surface of the body and on which the container is seated; a body accommodation portion which is recessed in a bottom surface of the container so that the container seating portion is inserted, and is in close contact with the container seating portion when the container is seated to fix the container; and an air vent which passes through a lower end of the container and communicates with the body accommodation portion, and through which air enters and exits the body accommodation portion when the container is mounted on the body.

A container coupling portion protruding downward and inserted into the container seating portion may be defined in an inner center of the body accommodation portion.

A lower end of a blade module may be exposed at a center of the container coupling portion, an upper end of the motor assembly coupled to the lower end of the blade module may be exposed at a center of the container seating portion, and when the container is seated, the blade module and the motor assembly may be connected to each other.

A lower support portion defining an outer circumferential surface of the container and spaced apart from a circumferential surface of the container coupling portion may be defined at the lower end of the container, and the air vent may pass through the lower support portion.

The lower support portion may extend further downward than the container coupling portion, and an outer surface of the lower support portion and an outer surface of the container seating portion may form the same plane.

The air vent may be configured to extend upward from a lower end of the lower support portion and configured to become narrower upward.

A height of the air vent may be greater than an upper end of the container seating portion.

The container seating portion may include: a first seating portion protruding upward from a top surface of the body and having an outer diameter corresponding to an outer diameter of the container; and a second seating portion protruding upward from a top surface of the first seating portion and having an outer diameter less than that of the first seating portion.

The lower support portion may be supported by the first seating portion, and a space into which the container coupling portion is inserted may be defined inside the second seating portion.

The air vent may extend from a lower end of the lower support portion to a position higher than an upper end of the second seating portion.

The container may include: an outer container defining an outer appearance; and an inner container spaced apart from the outer container and defining a space in which food is accommodated, wherein the lower support portion may be formed by extending the outer container, and the air vent may pass through the outer container.

A plurality of coupling guides protruding outward at equal intervals may be defined around the container coupling portion, and the container seating portion may include: coupling support portions supporting an outer surface of the container coupling portion and spaced apart from each other at equal intervals; and a guide coupling groove into which the coupling guide is inserted is defined between the coupling support portions spaced apart from each other.

A top surface of the coupling support portion may be inclined or rounded so as to be lowered from a center toward both sides.

A handle may protrude from an outer surface of the container, and the air vent may pass through the outer surface of the container in a direction crossing the handle.

The air vent may be defined by cutting from a lower end of the container to a position lower than a top surface of the body accommodation portion.

Advantageous Effects

The blender according to the embodiment of the present disclosure may have the following effects.

The container seating portion is defined on the top surface of the body, and the container may be seated on the container seating portion. In this case, the lower surface of the container may be provided with the body accommodation portion in which the container seating portion is inserted and is in close contact with each other, and the container may be mounted so as to be in close contact with the body. Thus, the container may be securely mounted to the body.

In addition, the air vent may be provided at the lower end of the container, and the air vent may communicate with the body accommodation portion. Thus, when the container is mounted to or detached from the body, air flows through the air vent to prevent sealing between the container seating portion and the body accommodation portion, so that the container may be easily mounted and detached.

Particularly, air may flow into the air vent when the container is separated, and thus the container may be easily separated. In addition, since the sealing between the container and the body is prevented, the body does not move along with the container, and ease of use and stability may be improved.

In addition, the container seating portion is provided with a first seating portion and a second seating portion, and the coupling support portion and the container coupling portion are formed on the lower surface of the container so as to be supported and inserted into the first seating portion and the second seating portion. Thus, the container may be more firmly mounted to the body, and any separation or movement of the container may be prevented when the motor assembly is operated.

In addition, the container may be easily separated due to the air vent while the container is firmly mounted.

In addition, the air vent is defined at the bottom of the container, and is formed in a direction crossing the handle, so that it is not easily noticeable by the user, and thus the outer appearance may be aesthetically pleasing.

In addition, the air vent has a structure that is cut at the lower end of the container, and has a structure that becomes wider downward. Thus, air may be easily discharged.

In addition, due to the nature of the cut structure, clogging by foreign substances may be prevented. Thus, the flow of air may be ensured.

MODE FOR CARRYING OUT THE INVENTION

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

Figure 1:
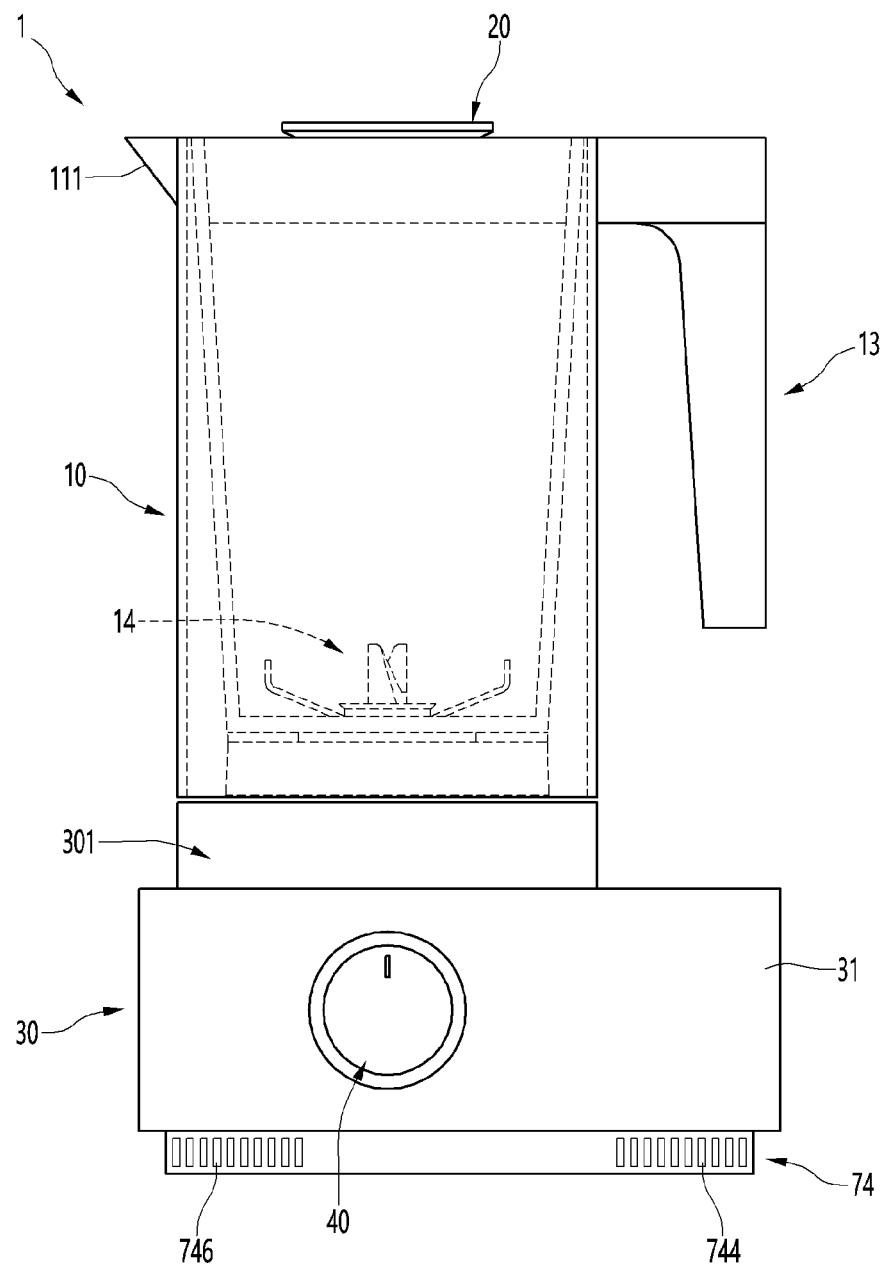
FIG. 1 is a front view of a blender according to an embodiment of the present invention.
Figure 2:
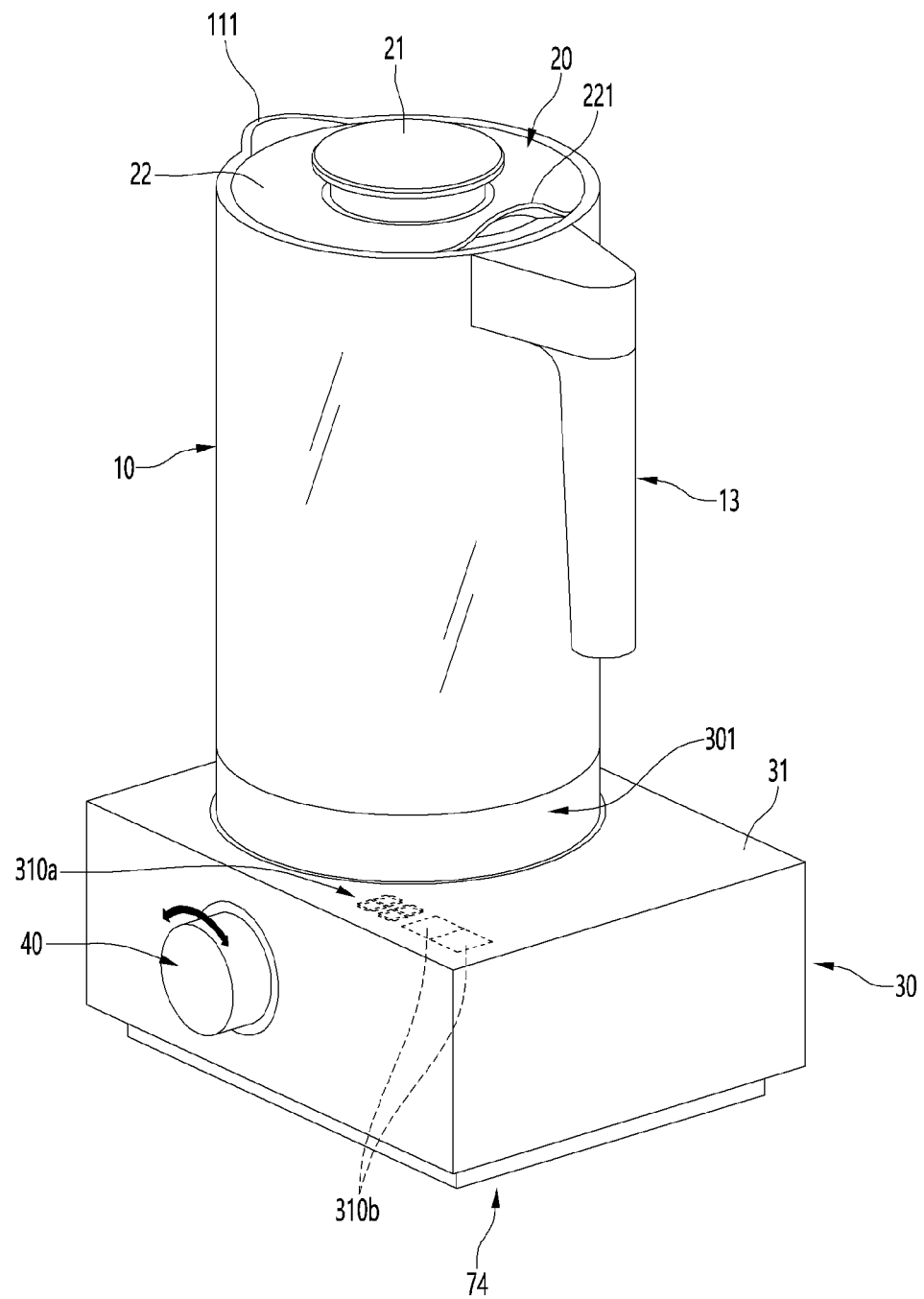
FIG. 2 is a perspective view of the blender.
Figure 3:
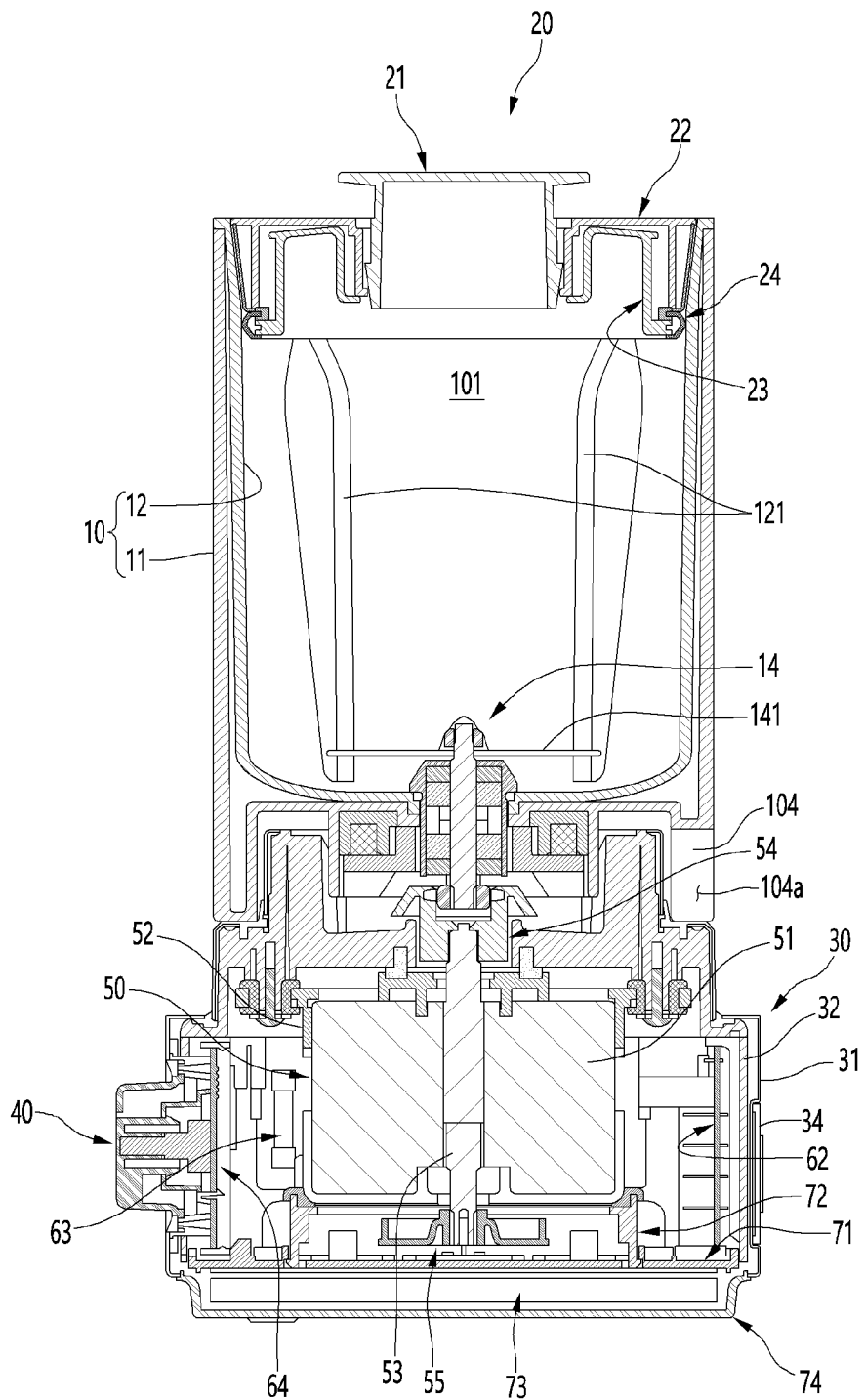
FIG. 3 is a longitudinal cross-sectional view of the blender.

FIG. 1 is a front view of a blender according to an embodiment of the present invention. Also, FIG. 2 is a perspective view of the blender. Also, FIG. 3 is a longitudinal cross-sectional view of the blender.

For the convenience of explanation and understanding, directions are defined first. A position at which a knob 40 is disposed is referred to as a front surface or a front side, and a portion to which a power connector (reference numeral 35 in FIG. 10) is connected is defined as a rear surface or a rear side. In addition, a position of the bottom of the body 30 may be referred to as a bottom surface or a lower side, and a position of an upper end of a container 10 may be referred to as a top surface or an upper side. In addition, a left side with respect to the knob 40 may be referred to as a left surface or a left direction, and a right side with respect to the knob 40 may be defined as a right surface or a right direction.

As illustrated in the drawings, a blender 1 according to an embodiment of the present invention may include a body 30 disposed on a bottom surface, and a container 10 seated on an upper portion of the body 30.

In the body 30, electrical devices and components including a motor assembly 50 and a PCB module 64 for an operation of the blender 1 may be disposed. In addition, manipulation portions 40 and 310b for manipulating the operation of the blender 1 and a display portion 310a for displaying the operation may be provided.

The body 30 may have a hexahedral shape as a whole, and a container seating portion 301 for seating the container 10 thereon may be provided on a top surface of the body 30. The container seating portion 301 may be configured so that the container 10 is detachable in a vertical direction.

An outer appearance of the body 30 may be defined by an outer case 31 made of a metal material or having a metal texture, and the outer case 31 may have a hexahedral shape with an opened bottom surface. In addition, an inner case 32 may be provided inside the outer case 31, and a space in which the motor assembly 50 and the PCB module 64 are mounted may be provided inside the inner case 32.

The knob 40 for setting the operation of the blender 1 by a user may be provided on the front surface of the body 30.

The knob 40 may protrude from the front surface of the body 30 and may be manipulated to set the operation of the blender 1 by rotation thereof.

A bottom cover 74 may be provided on the bottom surface of the body 30. The bottom cover 74 may be coupled to the outer case 31 and the inner case 32 and may be disposed to be in contact with the bottom surface on which the blender 1 is installed. In addition, the bottom cover 74 may allow the outer case 31 and the inner case 32 to be spaced apart from the bottom surface, and a cover suction hole 744 and a cover discharge hole 746, through which cooling air is suctioned into and discharged from the body 30, may be defined in the bottom cover 74.

A display portion 310a for visualizing an operation state of the blender 1 may be provided on the top surface of the body 30. For example, the display portion 310a may be provided in the form of at least one seven-segment display. In addition, a touch manipulation portion 310b capable of manipulating start or stop of the operation of the blender 1 may be provided on the top surface of the body 30. For manipulating the blender 1, the manipulation portions 40 and 310b may include at least one of the knob 40 or the touch module 310b.

In addition, the container seating portion 301 may be provided on the top surface of the body 30. The container seating portion 301 may protrude from the top surface of the body 30, and a portion of the container seating portion 301 may be inserted into a bottom surface of the container 10 to stably support the container 10. When the container 10 is seated on the container seating portion 301, the motor assembly 50 and the blade module 14 inside the container 10 may be coupled to each other to transmit rotational force to the blade module 14.

The container seating portion 301 may be disposed at one side that is slightly biased from a center of the body 30. A total horizontal length including a handle 13 of the container 10 and a horizontal length of the body 30 correspond to each other. Thus, a center of a food accommodation space of the container 10 may be disposed to be eccentric from a center of the body 30, and a center of the container seating portion 301 may also be disposed in the same extension line as the center of the container 10. In addition, the knob 40 may be disposed at a position corresponding to the center line of the container seating portion 301 and the container 10 and may be disposed at an eccentric side of the front surface of the body 30.

The container seating portion 301 may also be made of the same material as the outer case 31. The container seating portion 301 may be made of a metal material or a material having a metal texture to have a sense of unity with the outer appearance of the body as a whole.

The motor assembly 50 may be mounted inside the body 30 below the container seating portion 301. The motor assembly 50 may be provided for rotation of the blade module 14 inside the container 10 and may rotate at a high speed. In addition, the rotational speed of the motor assembly 50 may be adjusted according to the manipulation of the knob 40.

An upper end of the motor assembly 50 may be connected to the blade module 14 inside the container 10. In addition, a cooling fan 55 may be provided at a lower end of the motor assembly 50, and when the motor assembly 50 is driven, the cooling fan 55 may rotate at the same time with the blade module 14 to force a flow of cooling air inside the body 30.

A plurality of PCB modules 62, 64 may be disposed on an inner wall surface of the inner case 32 defining an inner surface of the body 30. The PCB modules 62, 64 provided in plurality may be disposed around the inner surface of the body 30, that is, on front and rear surfaces and both left and right surfaces, respectively.

In addition, an opened bottom surface of the inner case 32 may be shielded by a base plate 71. In addition, the base plate 71 may be provided with an air guide 72 for guiding the discharge of the cooling air suctioned by the cooling fan 55.

A predetermined space may be defined between the base plate 71 and the bottom cover 74, and a wireless power module 73 may be provided between the base plate 71 and the bottom cover 74. The wireless power module 73 may supply power to the motor assembly 50 in a wireless manner using induced electromotive force.

The container 10 may be provided in a cylindrical shape corresponding to an outer diameter of the container seating portion 301, and a top surface of the container 10 may be opened to access the food accommodation space therein. The container 10 may be made of glass or a material capable of allowing visual recognition inside the container.

The container 10 may be provided with a blade module 14 at a center of the inner bottom surface. The blade module 14 includes a plurality of blades 141 and may be connected to the motor assembly 50. Thus, when the motor assembly 50 is driven while the container 10 is seated on the body 30, the blades 141 may rotate to crush or cut the food inside the container 10.

In addition, a plurality of inner guides 121 for guiding the rotating food may be provided inside the container 10. Each of the inner guides 121 may extend upward by a predetermined length from a lower end of the inner surface of the container 10 and may extend to a bottom surface of a lid 20 when the lid 20 is mounted.

A spout 111 for pouring the crushed food may protrude from an upper end of the container 10, and a handle 13 may protrude from one side facing the spout 111. The handle 13 may protrude outward from the upper end of the container 10 and extend downward so that the user may lift or move the container 10. The protruding end of the handle 13 may be disposed in the same extension line as a side end of the body 30.

In addition, the lid 20 may be mounted on the opened top surface of the container 10. The lid 20 may shield the opened top surface of the container 10, and the user may hold the lid handle 13 and separate the lid 20 from the container 10 to open or close the opened top surface of the container 10. The lid 20 may include a lid upper portion 22, a lid lower portion 23, and the lid handle 21, and a lid gasket 24 may be provided along a circumference of the lid 20.

Hereinafter, a structure of the container 10 will be described in more detail with reference to the drawings.

Figure 4:
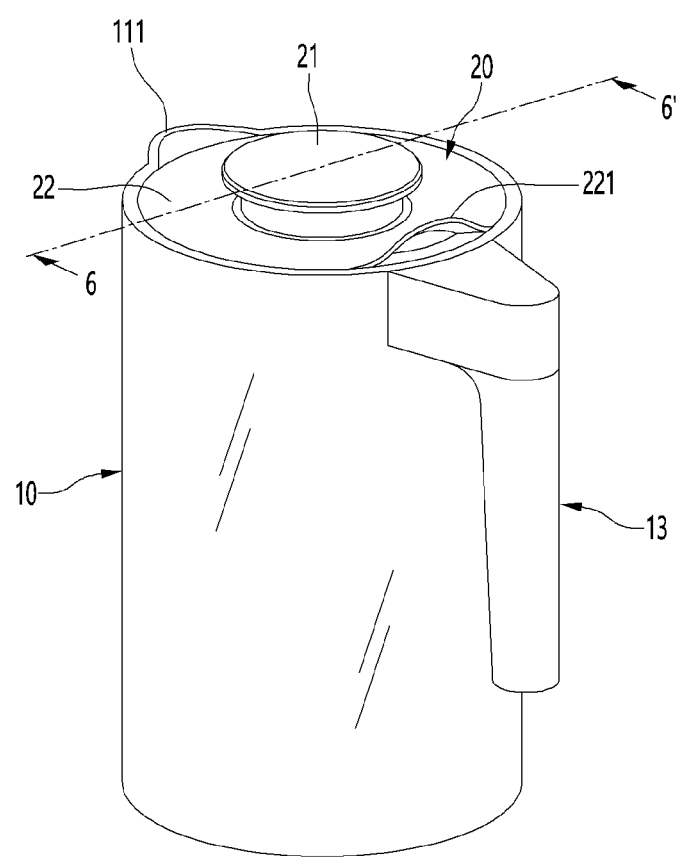
FIG. 4 is a perspective view of the container that is one component of the blender.
Figure 5:
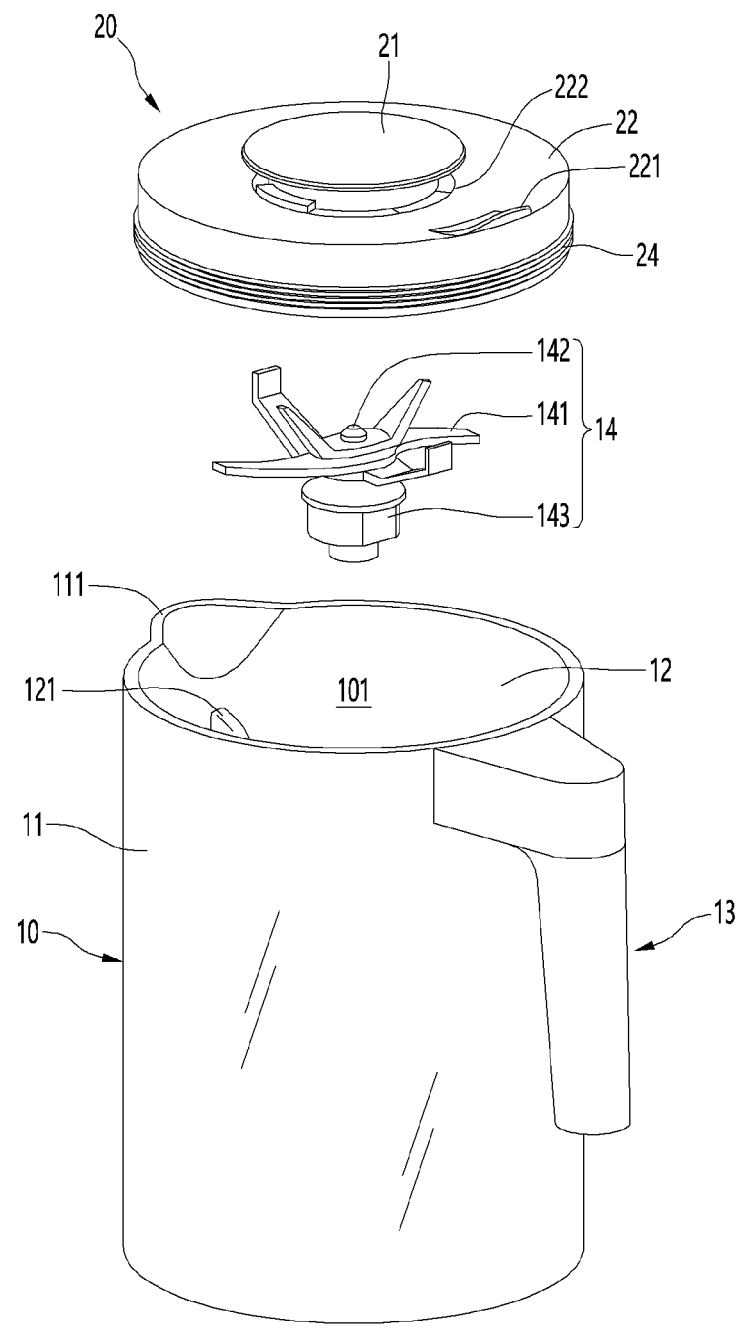
FIG. 5 is an exploded perspective view of the container.
Figure 6:
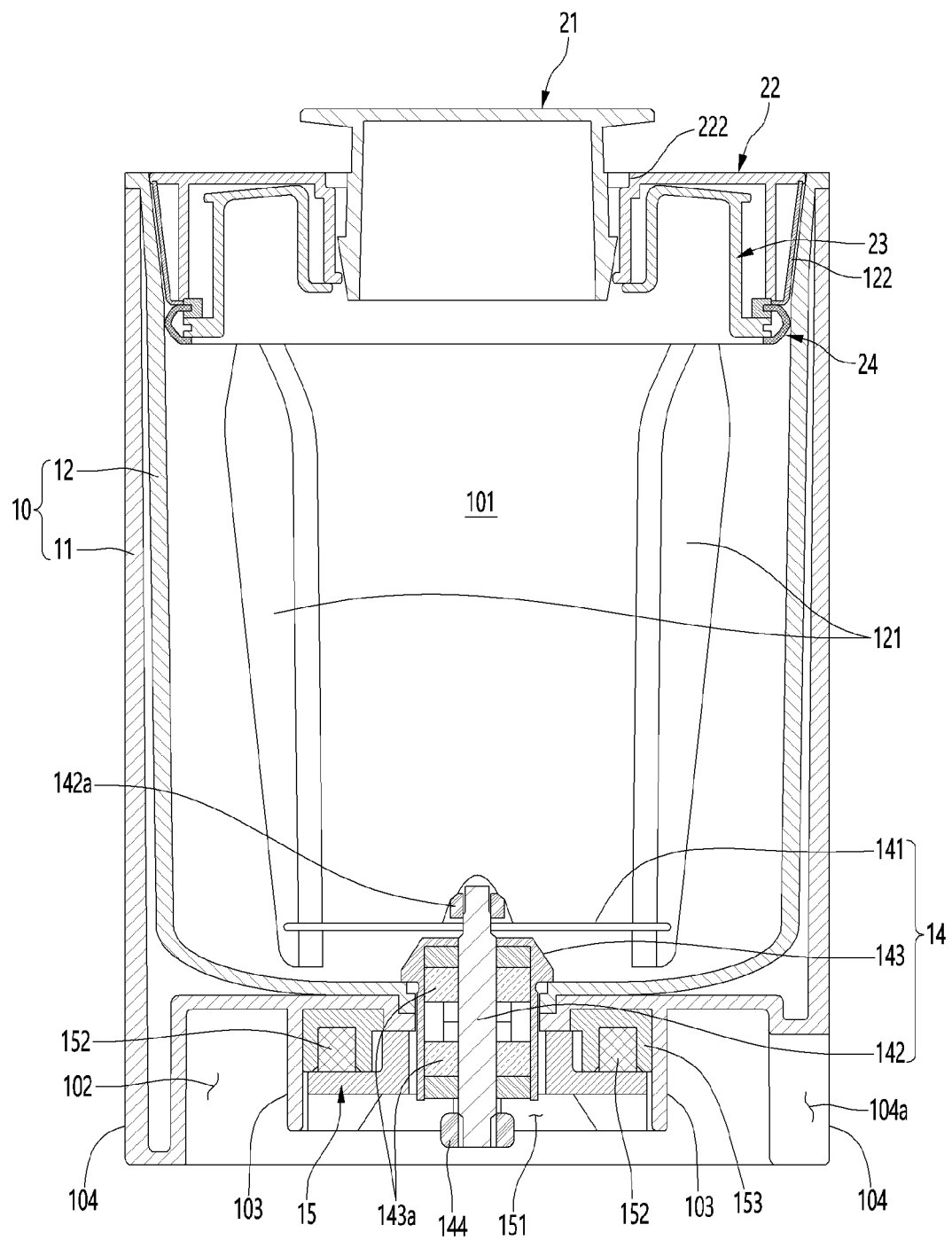
FIG. 6 is a cross-sectional view taken along line 6-6' of FIG. 4.
Figure 7:
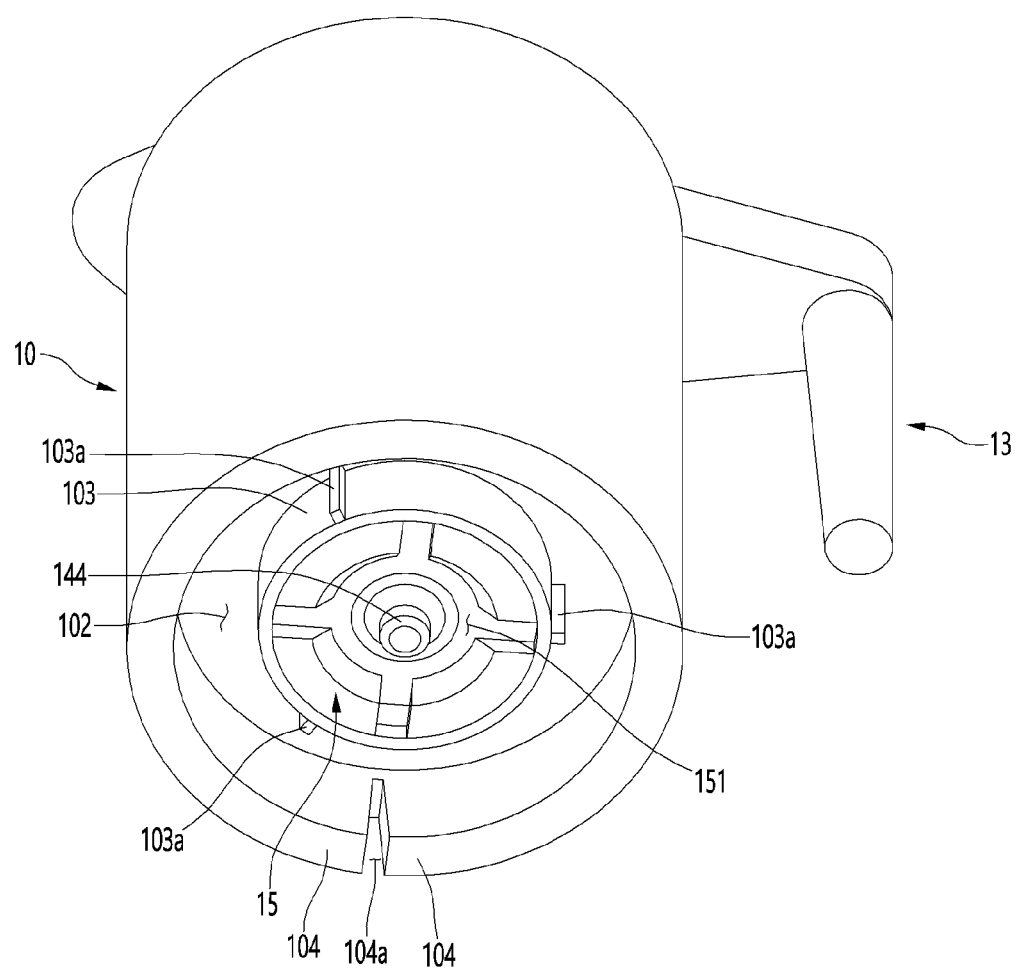
FIG. 7 is a perspective view of the container when viewed from below.

FIG. 4 is a perspective view of the container that is one component of the blender. FIG. 5 is an exploded perspective view of the container. FIG. 6 is a cross-sectional view taken along line 6-6' of FIG. 4. FIG. 7 is a perspective view of the container when viewed from below.

As illustrated in the drawings, the container 10 is provided in a cylindrical shape with an opened top surface. In addition, the blade module 14 may be mounted on the bottom surface of the container 10, and the lid 20 may be detachably mounted on the opened top surface of the container 10.

The container 10 may be made of a material such as glass, tritan, transparent plastic, etc., so that the state of the food therein can be checked during the operation of the blender 1. In addition, the container 10 may include an outer container 11 defining an outer shape, and an inner container 12 defining an inner space in which food is accommodated.

The inner container 10 and the outer container 11 may be coupled to each other to define the overall shape of the container 10, and the container 10 may have a double-wall structure. In addition, the outer container 11 may be provided in a cylindrical shape having the same outer diameter at an upper end and a lower end thereof so that the outer appearance of the container 10 is seen to be neat. In addition, an outer diameter of the outer container 11 may be provided to be the same as an outer diameter of the container seating portion 301, so that the body 30 and the container 10 have a sense of unity when the container 10 is mounted.

In addition, a body accommodation portion 102 may be defined in the bottom surface of the outer container 11. The body accommodation portion 102 defines a space that is recessed upward from the bottom surface of the outer container 11 and defines a space into which a second seating portion 325 to be described below is inserted. The body accommodation portion 102 and the second seating portion 325 may be coupled to each other so that the container 10 is maintained in a state of being mounted on the container seating portion 301.

A container coupling portion 103 on which the blade module 14 is mounted may be provided at a center of the bottom surface of the outer container 11. The container coupling portion 103 may be located at the inner surface of the outer container 11 and the inner center of the body accommodation portion 102. The container coupling portion 103 may protrude downward in a rib shape that extends downward with the center of the bottom surface of the container 10 as a center. In addition, the container coupling portion 103 does not extend further downward than the lower end of the outer container 11, and provides a space in which the blade module 14 is disposed in the center of the container 10. In addition, the inside of the container coupling portion 103 may have a structure in which the container can mate with the inside of the container seating portion 301 when the container is seated on the container seating portion 301.

In addition, a lower support portion 104 may be defined in a bottom circumference of the container 10. The lower support portion 104 may be spaced apart from the circumference of the container coupling portion 103, and the body accommodation portion 102 may be defined between the lower support portion 104 and the container coupling portion 103. The body accommodation portion 102 defines a space into which the upper end of the container seating portion 301 may be inserted.

The lower support portion 104 may be formed by extending the outer container 11 downward, and may define the circumference of the lower end of the container 10. In addition, the lower support portion 104 may be formed by the shape in which the outer container 11 is bent.

The lower end of the lower support portion 104 may be formed to have a predetermined thickness, and may be supported by the stepped container seating portion 301. In addition, the outer surface of the lower support portion 104 may be located on the same plane as the outer surface of the container seating portion 301. In a state in which the container 10 is mounted on the container seating portion 301, the container 10 and the body 30 may have a sense of unity.

The lower support portion 104 may extend further downward than the lower end of the container coupling portion 103. Thus, it is possible to prevent the container coupling portion 103 from interfering with the container seating portion 301 before the container 10 is completely mounted on the body 30. In addition, when the container 10 is placed on the floor in a separated state, the container coupling portion 103 may be spaced apart from the floor. The lower support portion 104 may be in contact with the floor so that the container 10 may be stably supported.

An air vent 104a may be defined in the lower support portion 104. The air vent 104a may provide a passage through which air is entered and exited between the bottom surface of the container 10 and the top surface of the container seating portion 301 when the container 10 and the container seating portion 301 are coupled to or separated from each other. Thus, the container 10 may be easily mounted on and separated from the container seating portion 301.

Referring to the structure of the air vent 104a in more detail with reference to FIGS. 6 and 7, the air vent 104a may pass through the container 10 from the side and communicate with the body accommodation portion 102.

That is, the air vent 104a passes through the outer container 11 defining the lower support portion 104, and communicates with the body accommodation portion 102. The body accommodation portion 102 and the outside can communicate with each other through the air vent 104a to allow air to enter and exit.

The air vent 104a may be formed by cutting a portion of the lower support portion 104. The air vent 104a may extend in the vertical direction, and may be formed so that the cut width thereof becomes narrower toward the upper side. The air vent 104a may be formed with the widest lower end. When the container 10 is mounted and separated, the inflow or outflow of air may be made smooth and foreign substances may be prevented from being caught.

Figure 12:
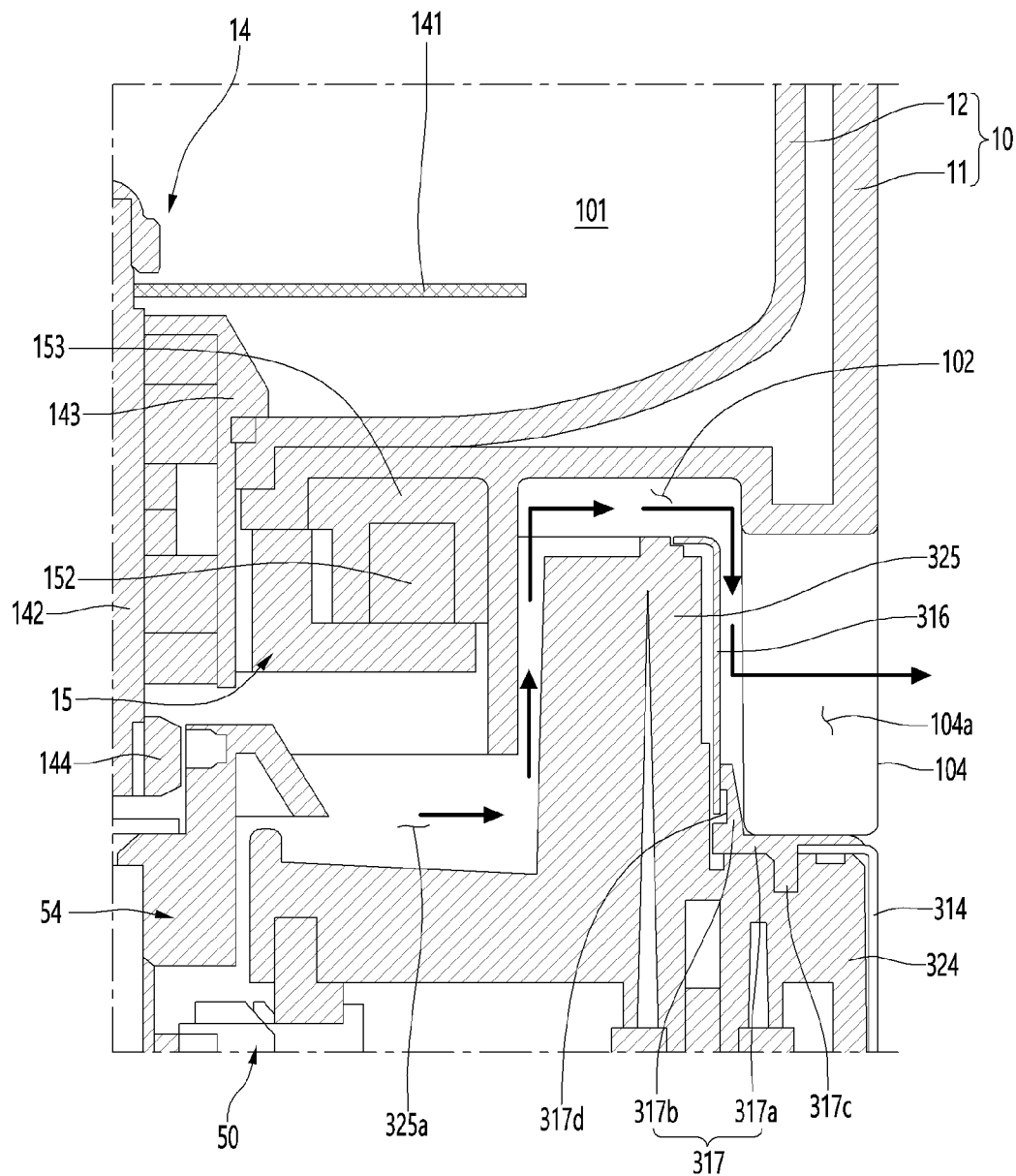
FIG. 12 is a cross-sectional view illustrating air flow in a state in which the container is coupled.

The air vent 104a may be formed at the lower end of the container 10, that is, the lower end of the lower support portion 104, and may extend upward. The air vent 104a may extend to a height corresponding to the top surface of the body accommodation portion 102 or to a height slightly lower than the top surface of the body accommodation portion 102. In addition, the air vent 104a may be cut to a position higher than the upper end of the container seating portion 301. That is, as illustrated in FIG. 12, in a state in which the container 10 is mounted, the upper end of the air vent 104a is positioned higher than the upper end of the container seating portion 301. Even in a state in which the container 10 is mounted, air smoothly flows into the body accommodation portion through the air vent 104a.

Particularly, the air vent 104a is formed so that the width thereof becomes narrower toward the upper side. In a state in which the container 10 is seated on the container seating portion 301, most of the circumference of the container 10 may be in contact with the circumferential surface of the container seating portion 301. Thus, in a state in which the container 10 is seated, the substantially entire circumference of the container 10 is supported by the container seating portion 301, and the container 10 may maintain the firmly seated state.

The inner container 12 may be spaced apart from the outer container 11 to define a space between the outer container 11 and the inner container 12. The inner container 12 may have a diameter that gradually decreases downward. A lower portion of the inner container 12 may be inclined or rounded toward the blade module 14, and may direct the food inside the container 10 toward the blade module 14.

An upper end of the inner container 12 may have an inclined surface 122 of which an inner diameter is narrowed downward. Therefore, in the process of inserting the lid 20 into the opened top surface of the container 10, the lid 20 may have a structure that seals while being gradually in close contact with the inner container 12. The inclined surface of the upper end of the inner container 12 may be provided from the upper end of the container 10 to the upper end of the inner guide 121 and may be disposed along a circumference of the inner surface of the container 10. In addition, the inner guide 121 may be disposed on the inner surface of the inner container 12. The inner guide 121 may extend from the inclined surface 122 to the bottom surface of the inner container 12.

The lid 20 may include a lid upper portion 22 defining a top surface and a lid lower portion 23 coupled to the lid upper portion 22 to define a bottom surface of the lid 20. The lid handle 21 may be inserted and mounted in an opened center of each of the lid upper portion 22 and the lid lower portion 23 and may be provided detachably. Thus, in a state in which the lid handle 21 is separated, food may be added or accessible to the inner space 101 of the container 10.

In addition, a lid gasket 24 that is in contact with the inner surface of the container 10 to seal the inside of the container 10 may be provided around the lid 20. Thus, the lid 20 may be inserted through the opened top surface of the container 10, and the lid gasket 24 may be in contact with the inclined surface 122 of the container while the lid 20 is mounted to maintain the sealing. In addition, the lid gasket 24 may be pressed and be in close contact with the inner surface of the container 10 to prevent the lid 20 from being unintentionally separated from the container 10.

A handle portion 221 may be further disposed on an outer end of the upper lid 22. The handle portion 221 has a shape in which a portion of the upper lid 22 protrudes upward so that the user can hold the handle portion 221 by hand and may be spaced apart from the lower lid 23 to provide a space for a finger to be inserted. Thus, when the lid handle 21 is not used, or the lid handle 21 is separated, the user may easily separate the lid 20 by holding the handle portion 221.

The blade module 14 may be provided at the center of the bottom surface of the container 10. The blade module 14 may be configured to crush the food accommodated in the inner space 101 of the container 10 and may include a plurality of blades 141, a blade shaft 142, and a shaft mounting member 143.

The plurality of blades 141 may extend in different directions. Here, the plurality of blades may be combined with each other, and also, the plurality of blades may be disposed radially with respect to the blade shaft 142 as an axis. The blades 141 may be disposed to be symmetrical about the blade shaft 142, and extending directions, bent angles, and shapes of the plurality of blades 141 may be provided differently. That is, the blades 141 having various shapes may be combined and configured so as to be suitable for crushing and cutting various foods and making food into powder or liquid-like state.

The blade shaft 142 may be mounted to pass through the shaft mounting member 143 and may be supported by a bearing 143a constituting the shaft mounting member 143. A plurality of the bearings 143a may be disposed in the vertical direction and may support the blade shaft 142 to rotate stably. In addition, the shaft mounting member 143 may be firmly fixed through the bottom surface of the container 10.

A blade restriction member 142a is coupled to an upper end of the blade shaft 142 to prevent separation of the blade 141 and to maintain the blade 141 in a state of being fixed to the blade shaft 142.

In addition, a blade-side connection portion 144 may be disposed at a lower end of the blade shaft 142. The blade-side connection portion 144 may be exposed at the center of the bottom surface of the container 10 to protrude downward. Thus, when the container 10 is mounted on the container seating portion 301, the blade-side connection portion 144 may be connected to a motor-side connection portion 54 to be described below so that the power of the motor assembly 50 is transmitted.

The container coupling portion 103 may be defined on the bottom surface of the container 10, and a mounting cover 15 may be provided inside the container coupling portion 103. The mounting cover 15 defines an accommodation space 151 in which the motor-side connection portion 54 may be accommodated when the container 10 is mounted on the container seating portion 301.

That is, the center of the mounting cover 15 may be opened to allow the shaft mounting member 143 to pass therethrough, and the blade-side connection portion 144 may be exposed through the center of the bottom surface of the mounting cover 15. In addition, the central portion of the mounting cover 15 corresponding to the circumference of the blade-side connecting portion 144 is recessed so that the motor-side connecting portion 54 may be accommodated.

Thus, in the process in which the container 10 is seated on the container seating portion 301, the motor-side connection portion 54 and the blade-side connection portion 144 have a structure that can be naturally coupled to each other without interfering with each other.

A mounting case 153 and a detection member 152 may be further provided inside the container coupling portion 103. The mounting case 153 may be fixed and mounted on the inside of the container coupling portion 103, and the detection member 104 may be configured to transmit information on whether the container 10 is mounted and information on the container 10 to the detection device of the body 30.

That is, when the container 10 is mounted on the container mounting portion 301, a detection device provided on the body 30 may detect the detection member 152 to detect the mounting of the container 10, may also identify the type of the container 10. The detection member 152 may be made of a magnet, and the detection device may be a Hall sensor that detects the detection member 152 made of a magnet.

Hereinafter, the structure of the body 30 will be described in detail with reference to the drawings.

Figure 8:
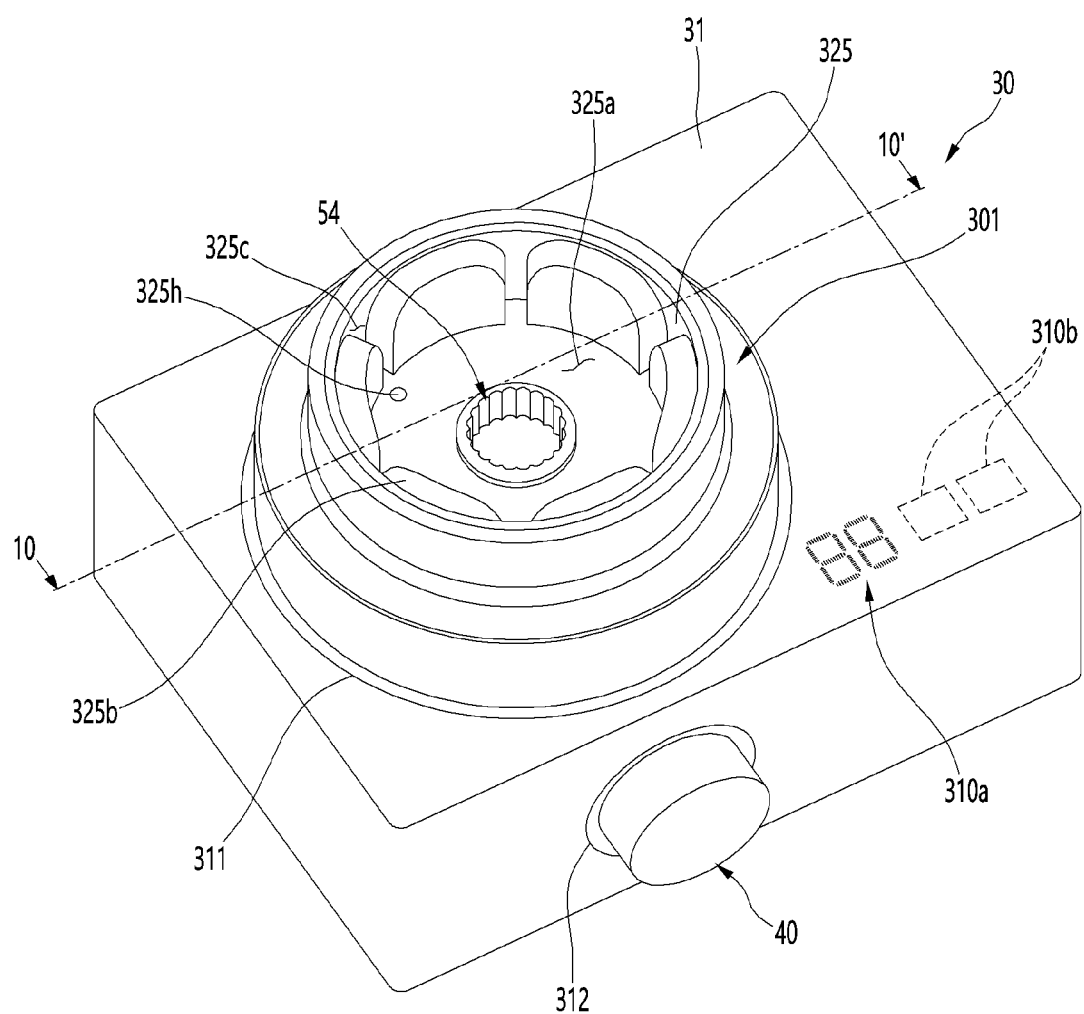
FIG. 8 is a perspective view of the body that is one component of the blender.
Figure 9:
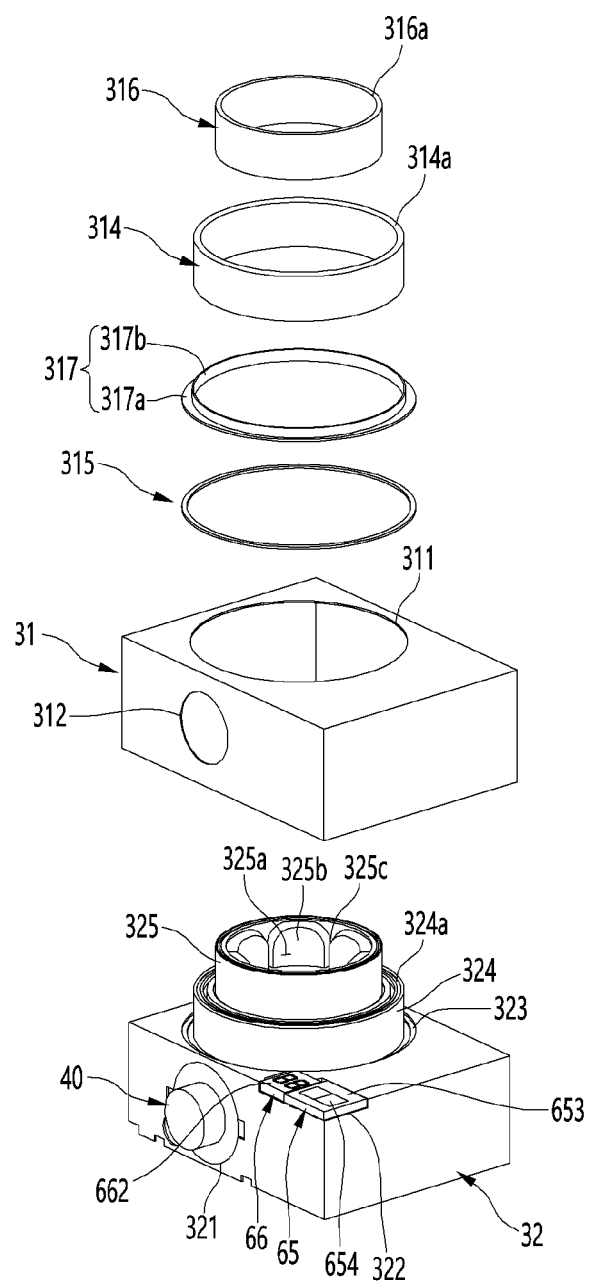
FIG. 9 is an exploded perspective view illustrating a coupling structure of components defining an outer appearance of the body.
Figure 10:
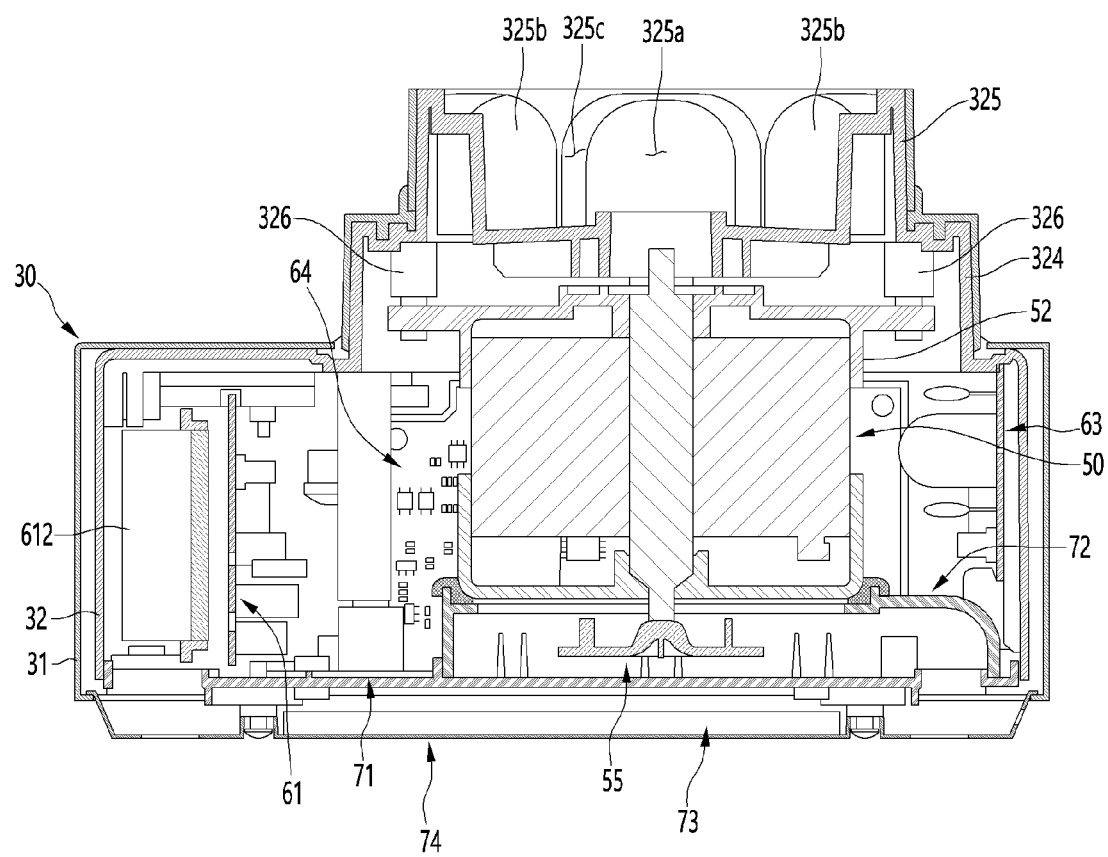
FIG. 10 is a cross-sectional view taken along line 10-10' of FIG. 8.

FIG. 8 is a perspective view of the body that is one component of the blender. FIG. 9 is an exploded perspective view illustrating a coupling structure of components defining an outer appearance of the body. FIG. 10 is a cross-sectional view taken along line 10-10' of FIG. 8.

As illustrated in the drawings, the body 30 may be formed in a rectangular parallelepiped box shape. In addition, a container seating portion 301 for mounting the container 10 may be formed to protrude on the top surface of the body 30, and a knob 40 for manipulating the operation of the blender 1 may be disposed on the front surface of the body 30.

The inner and overall structure of the body 30 may be defined by the inner case 32, and the outer case 31 may be mounted on the outside of the inner case 32 to define the outer appearance of the body 30. The inner case 32 may be an injected plastic material that provides a structure in which the internal and external components of the body 30 are mounted. In addition, the outer case 31 may be made of a metal material such as stainless steel, and a plate-shaped material may be bent and bonded to provide a very clean and solid appearance.

Each of the outer case 31 and the inner case 32 may have an open bottom surface, and the motor assembly 50 and the plurality of PCB modules 61, 63, 64 may be disposed inside the outer case 31 and the inner case 32. In addition, the opened bottom surface of the inner case 32 may be shielded by the base plate 71, and the bottom surface of the body 30 may be defined by the bottom cover 74.

Referring to the structure of the body 30 in more detail, the outer case 31 may include a rectangular top surface, and front and rear surfaces, and left and right surfaces, which extend downward along a circumference of the top surface.

A top surface opening 311 may be defined in a top surface of the outer case 31. The top surface opening 311 may have a diameter equal to or slightly greater than an outer diameter of the container seating portion 301. Thus, when the inner case 32 and the outer case 31 are coupled to each other, the upper portion of the inner case 32 defining the container seating portion 301 may pass through the top surface opening 311 and then be exposed to the outer case 31.

A first seating portion decor 314, a second seating portion decor 316, a lower decor 315, and a connection decor 317 may be mounted on an upper portion of the inner case 32 protruding to the outside of the outer case 31. An overall outer appearance of the container seating portion 301 may be defined by the first seating portion decor 314, the second seating portion decor 316, the lower decor 315, and the connection decor 317. The first seating portion decor 314 and the second seating portion decor 316 may be made of the same material as the outer case 31 or a material having the same texture as the outer case 31.

Each of the first seating portion decor 314 and the second seating portion decor 316 may be provided in a ring shape having a predetermined height. The first seating portion decor 314 may have a diameter greater than that of the second seating portion decor 316, and the connection decor 317 may be provided in a ring shape that connects an upper end of the first seating portion decor 314 to the second seating portion decor 316.

In addition, the first seating portion decor 314, the second seating portion decor 316, and the connection decor 317 may be mounted on outer surfaces of a first seating portion 324 and a second seating portion 325, which are disposed on the inner case 32, and a top surface of the first seating portion 324, respectively.

A lower decor mounting portion 323 may be disposed on the top surface of the inner case 32 that is in contact with a lower end of the first seating portion 324. The lower decor mounting portion 323 may be disposed along a circumference of the first seating portion 324 so that the lower decor 315 is mounted thereon.

The lower decor 315 may be made of a plastic or rubber material and may be provided in a ring shape. In addition, when the first seating portion decor 314 is mounted, a space between the first seating portion decor 314 and the outer case 31 may be filled so that a gap is not visible. That is, the gap between a lower end of the second seating portion decor 316 made of a metal material and a circumference of the top surface opening 311 may be sealed to define a portion of the outer appearance.

The second seating portion 325 may be disposed on a top surface of the first seating portion 324. The second seating portion 325 may have an outer diameter less than that of the first seating portion 324. In addition, a connection decor mounting portion may be disposed on the top surface of the first seating portion 324. The connection decor mounting portion 324a may be disposed along a circumference of a lower end of the second seating portion 325 and may be disposed on the top surface of the first seating portion 324.

The connection decor 317 may be mounted on the connection decor mounting portion 324a. The connection decor 317 may connect an upper end of the first seating portion decor 314 to a lower end of the second seating portion decor 316 and may be provided in a ring shape having a predetermined width. That is, the connection decor 317 may define the top surface of the first seating portion 324 and also define an outer appearance between the first seating portion decor 314 and the second seating portion decor 316.

The connection decor 317 may be constituted by a horizontal portion 317a and a vertical portion 317b. The horizontal portion 317a may have a width corresponding to that of the connection decor mounting portion 324a. In addition, a mounting protrusion 317c protruding downward and inserted into the groove of the connection decor mounting portion 324a may be defined at the lower end of the horizontal portion 317a. In addition, a top surface of the horizontal portion 317a may define an outer appearance of the top surface of the first seating portion 324. The horizontal portion 317a connects the first seating portion 324 to the second seating portion 325, and defines a stepped surface between the first seating portion 324 and the second seating portion 325. In addition, the horizontal portion 317a provides a surface parallel to the top surface of the body 30. Thus, when the container 10 is mounted, the lower end of the container 10, that is, the lower end of the lower support portion 104 may be supported. Thus, the connection decor 317 or at least the horizontal portion 317a may be made of a rubber or plastic material, and the lower end of the container 10 may be stably supported.

The vertical portion 317b may extend vertically upward along an inner end of the horizontal portion 317a. In addition, the vertical portion 317b may cover the lower end of the second seating portion decor 316.

In detail, a decor groove 137d formed to be stepped may be defined at the upper end of the inner surface of the vertical portion 317c, and the lower end of the second seating portion decor 316 may be accommodated inside the decor groove 317d. Thus, the first seating portion decor 314 and the second seating portion decor 316 may be connected to each other by the connection decor 317.

The second seating portion 325 may extend upward from the top surface of the first seating portion 324, and an insertion space 325a into which the container coupling portion 103 is accommodated may be defined in the second seating portion 325. A coupling support portion 325b and a container coupling groove 325c may be formed on an inner surface of the insertion space 325a.

The coupling support portion 325b may form at least a portion of an inner circumferential surface of the second seating portion 325. In addition, when the container 10 is mounted, the coupling support portion 325b is protruded to support the outer surface of the container coupling portion 103. A plurality of the coupling support portions 325b may be spaced apart from each other, and the guide coupling groove 325c may be formed between the adjacent coupling support portions 325b.

In addition, the top surface of the coupling support portion 325b may be formed to protrude from the center and be inclined or rounded in both directions from the protruding center. Therefore, when the container 10 is mounted, the coupling guide 103a is in contact with the top surface of the coupling support portion 325b and the coupling guide 103a may be guided toward the guide coupling groove 325c.

The guide coupling groove 325c is recessed to the outside so that the coupling guide 103a may be inserted, and may be formed by the coupling support portions 325b disposed on both sides. The container coupling portion 103 may be formed to extend upward from the bottom surface of the insertion space 325a.

Thus, when the container 10 is mounted on the container mounting portion 301, the container coupling portion 103 may be mounted in an aligned state by the guide coupling groove 325c, and the detection member 104 and the detection device may be guided to face each other. In this case, due to the arrangement of the coupling guide 103a and the guide coupling groove 325c, the position of the container 10 is aligned so that the detection device recognizes the detection member 104 no matter what direction the container is mounted.

In addition, the coupling support portion 325b may support the outer surface of the container coupling portion 103 so that the container 10 may maintain a tight mounting state in a state of being mounted on the container seating portion 301. Thus, the container 10 does not fall in the mounted state and stable operation may be ensured.

A knob hole 312 in which the knob 40 is disposed may be defined in the front surface of the outer case 31. The knob 40 may protrude forward from the body 30 through the knob hole 312.

The inner case 32 may be provided in a box shape with an opened bottom surface, and the container seating portion 301 may be disposed on the top surface of the inner case 32. The inner case 32 may be constituted by a top surface having a planar shape as a whole, front and rear surfaces, and left and right surfaces vertically extending downward along a circumference of the top surface. The inner case 32 may be made of a plastic material to be molded to a relatively complex shape and may provide a structure for mounting the motor assembly 50 and the PCB modules 61, 63, and 64 therein.

A top surface mounting portion 322 may be disposed on the top surface of the inner case 32. The top surface mounting portion 322 may be recessed so that the display module 66 and the touch module 65 are mounted. The top surface mounting portion 322 may be provided to be stepped and be shielded by the outer case 31 in a state in which the display module 66 and the touch module 65 are mounted.

In addition, a display portion 310a provided in a 7-segment shape by a plurality of fine holes may be disposed in the outer case 31 corresponding to the display module 66, and light irradiated from the display module 66 may be transmitted to display operation information of the blender 1 in figures or letters.

In addition, a touch manipulation portion 310b may be disposed on the top surface of the outer case 31 corresponding to the touch module 65 through printing or surface processing. Thus, the user may touch the touch manipulation portions 40 and 310b to input manipulation for the operation of the blender 1.

The motor assembly 50 may be provided in the inner space of the inner case 32. The motor assembly 50 may be configured for the rotation of the blade module 14 and may be disposed below a central portion of the container seating portion 301.

The motor assembly 50 may include a motor 51 including a motor shaft 53 extending in a vertical direction, a motor housing 52 in which the motor 51 is accommodated, a motor-side connection portion 54 provided on an upper end of the motor shaft 53, and a cooling fan 55 provided on a lower end of the motor shaft 53.

The top surface of the motor housing 52 may be fixed and mounted to the motor mounting portion 326 defined in the inner case 32. In addition, a motor-side connection portion 54 may be provided at the upper end of the motor shaft 53 to couple to a blade-side connection portion 144 when the container 10 is mounted. The motor-side connection portion 54 may be coupled to the blade-side connection portion 144 to transmit the rotational force of the motor 51. The motor-side connection portion 54 may be exposed through the top surface of the inner case 32 and may be disposed in a center of the insertion space 325a inside the container seating portion 301. Also, the motor-side connection portion 54 is provided in a shape corresponding to the blade-side connection portion 144 so as to be coupled to each other. Thus, the power of the motor 51 may be effectively transmitted to the blade module 14.

A cooling fan 55 for forcing a flow of the cooling air inside the body 30 may be provided on a lower end of the motor shaft 53. Thus, when the motor 51 rotates, the cooling fan 55 may also rotate at the same time as the blade 141 rotates.

The cooling fan 55 may be exposed to the outside of the motor housing 52 and may be accommodated inside the air guide 72 mounted on the bottom plate 71. Thus, when the cooling fan 55 operates, the air passing through the motor housing 52 may be guided to the inside of the air guide 72.

The plurality of PCB modules for the operation of the blender 1 may be provided inside the inner case 32. The PCB modules may be disposed on the inner surfaces of the inner case 32, respectively. The PCB module may be provided in plurality, which are separated from each other according to their functions, and may be arranged in parallel with a wall surface of the inner case 32 at a position adjacent to the inner surface of the inner case 32.

In detail, the PCB module may include a main PCB module 64 on which the knob 40 is mounted to control the overall operation of the blender 1, an inverter PCB module 61 for controlling the motor 51, a power PCB module (not illustrated) for controlling input power, and a filtering PCB module 63 for removing noise. Of course, the PCB module may further include an additional PCB module, or some PCB modules may be omitted according to functions of the blender 1.

A base plate 71 may be provided on a lower end of the inner case 32. The base plate 71 may shield the opened bottom surface of the inner case 32 and may support some of the inner components of the inner case 32.

In addition, a plate suction hole and a plate discharge hole may be defined in both left and right sides of the base plate 71, respectively. The plate suction hole is defined along one end of the base plate 71 and may provide a passage through which air for cooling is introduced into the inner case 32 when the motor assembly 50 is driven. The plate discharge hole may be defined along the other end of the base plate 71 and provide a passage through which the cooling air inside the inner case 32 is discharged to the outside of the inner case 32.

An air guide 72 may be disposed on the top surface of the base plate 71. The air guide 72 supports the open lower end of the motor assembly 50 and is connected to the plate outlet to guide the discharge of the air cooled by the motor while passing through the motor assembly 50.

The wireless power module 73 may be provided on a bottom surface of the base plate 71. The wireless power module 73 may be configured to supply wireless power to the blender 1 and may receive power using an induced electromotive force method.

A bottom cover 74 may be provided below the base plate 71. The bottom cover 74 may define the bottom surface of the body 30 and may shield the opened bottom surface of the outer case 31. In addition, when the wireless power module 73 is mounted on the base plate 71, the wireless power module 73 may be shielded by the bottom cover 74.

The bottom cover 74 may be provided in a plate shape having a size corresponding to that of the opened bottom surface of the outer case 31, and a circumference of the bottom cover 74 may extend upward to the outer case 31 and then be coupled to the lower end of the outer case 31. In addition, a cover suction hole 744 and a cover discharge hole 746 may be defined in the bottom cover 74, and an inflow of external air and discharge of air radiated from the inside of the body 30 may be performed through the cover suction hole 744 and the cover discharge hole 746.

Hereinafter, the process of attaching and detaching the container 10 of the blender 1 having the above-described structure will be described in more detail with reference to the drawings.

Figure 11:
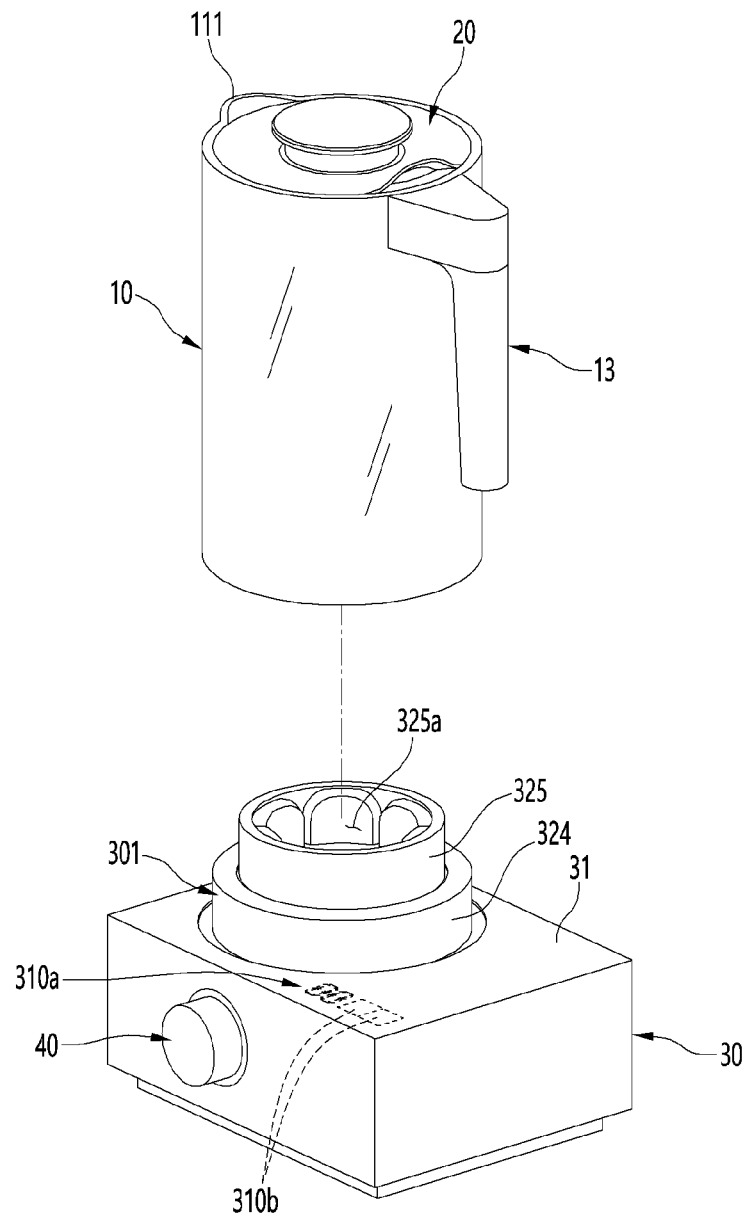
FIG. 11 is an exploded perspective view in which the body and the container are separated from each other.

FIG. 11 is an exploded perspective view in which the body and the container are separated from each other. FIG. 12 is a cross-sectional view illustrating the air flow in a state in which the container is coupled.

As shown in the drawings, the container 10 is mounted on the body 30 for use of the blender 1. In addition, when the container 10 is mounted, the body 30 may recognize the mounting of the container 10.

When the container 10 is mounted, the container coupling portion 103 may be inserted into the insertion space 325a inside the container seating portion 301. In this case, the coupling guide 103a may be inserted into the guide coupling groove 325c so that the container 10 may be aligned and mounted in an accurate position.

In a state in which the container coupling portion 103 is completely inserted into the insertion space 325a, the coupling support portion 325b may be disposed to contact with the outer surface of the container coupling portion 103.

Then, the upper end of the container seating portion 301, that is, the upper portion of the second seating portion 325 is in a state of being accommodated inside the body accommodation portion 102. In addition, the outer surface of the second seating portion 325 is in contact with the inner surface of the lower support portion 104. That is, the second seating portion 325 defining the upper portion of the container seating portion 301 is in contact with the outer surface of the container coupling portion 103 and the inner surface of the lower support portion 104, and is in close contact with each other. Thus, the container 10 may maintain a stably and firmly mounted state.

In addition, the lower end of the container 10, that is, the lower end of the lower support portion 104 may be supported on the top surface of the first seating portion 324, that is, the horizontal portion 317a of the connection decor 317. Thus, even in a state in which the blender 1 is operated at high speed, the container 10 stably maintains a state of being seated on the body 30.

Even in a state in which the container 10 is mounted on the body 30, the air vent 104a allows outside air to flow into the inner side of the body accommodation portion 102 and the insertion space 325a. In detail, in a state in which the container 10 is mounted, the upper end of the air vent 104a may extend to a position slightly higher than the upper end of the container seating portion 301, that is, the upper end of the second seating portion 325. The top surface of the main body accommodation portion 102 may be located at a higher position than the upper end of the air vent 104a. Thus, even in a state in which the container 10 is mounted, outside air may flow into the body accommodation portion 102 through the air vent 104a.

Thus, in a state in which the container 10 is mounted, the space between the container 10 and the body 30 is not sealed due to the air vent 104a. When the container 10 is to be separated from the body 30, outside air may flow into the body accommodation portion 102 through the air vent 104a. Thus, the container 10 may be easily separated from the container seating portion 301, and the body 30 does not move along with the container 10.

Also, in the process of mounting the container 10 to the container seating portion 301, the air inside the main body accommodation portion 102 and the insertion space 325a may be discharged to the outside through the air vent 104a, thereby enabling fast and easy mounting of the container 10.

A blender according to an embodiment of the present invention may include: a body provided with a motor assembly; a container which is detachably mounted to the body and in which food is accommodated; a container seating portion which is provided on a top surface of the body and on which the container is seated; a body accommodation portion which is recessed in a bottom surface of the container so that the container seating portion is inserted therein, and is in close contact with the container seating portion to fix the container when the container is seated; and an air vent which passes through a lower end of the container and communicates with the body accommodation portion, and through which air enters and exits the body accommodation portion when the container is mounted on the body.

A container coupling portion protruding downward and inserted into the container seating portion may be defined in an inner center of the body accommodation portion.

A lower end of a blade module may be exposed at a center of the container coupling portion, an upper end of the motor assembly coupled to the lower end of the blade module may be exposed at a center of the container seating portion, and when the container is seated, the blade module and the motor assembly may be connected to each other.

A lower support portion defining an outer circumferential surface of the container and spaced apart from a circumferential surface of the container coupling portion may be defined at the lower end of the container, and the air vent may pass through the lower support portion.

The lower support portion may extend further downward than the container coupling portion, and an outer surface of the lower support portion and an outer surface of the container seating portion may form the same plane.

The air vent may be configured to extend upward from a lower end of the lower support portion and is configured to become narrower upward.

The air vent may be formed to become narrower toward the upper side.

A height of the air vent may be higher than an upper end of the container seating portion.

The container seating portion may include: a first seating portion protruding upward from a top surface of the body and having an outer diameter corresponding to an outer diameter of the container; and a second seating portion protruding upward from a top surface of the first seating portion and having an outer diameter less than that of the first seating portion.

The lower support portion may be supported by the first seating portion, and a space into which the container coupling portion is inserted may be defined inside the second seating portion.

The inner surface of the second seating portion may be in close contact with the outer surface of the container coupling portion, and the outer surface of the second seating portion may be in close contact with the inner surface of the lower support portion.

The air vent may extend from a lower end of the lower support portion to a position higher than an upper end of the second seating portion.

The connection decor may include: first and second seating portion decors provided in the first seating portion and the second seating portion and made of a metal material to define the outer appearance of the container seating portion; and a connection decor connecting the first seating portion decor and the second seating portion decor and supporting the lower end of the container. The connection decor may be made of a non-metal material.

The body may include: an outer case made of the same metal material as the first seating portion decor and the second seating portion decor; and an inner case provided inside the outer case and injected with a plastic material to define the first seating portion and the second seating portion.

The container may include: an outer container defining an outer appearance; and an inner container spaced apart from the outer container and defining a space in which food is accommodated, wherein the lower support portion may be formed by extending the outer container, and the air vent may pass through the outer container.

The container coupling portion may protrude from the center of the container with a set radius, and the container seating portion may be recessed to support the outer surface of the container coupling portion.

A plurality of coupling guides protruding outward at equal intervals are formed around the container coupling portion. In the container mounting portion, a plurality of coupling support portions spaced apart from each other at equal intervals to support the outer surface of the container coupling portion, and a guide coupling groove into which the coupling guide is inserted between the coupling support portions spaced apart from each other may be formed.

A top surface of the coupling support portion may be inclined or rounded so as to be lowered from a center toward both sides.

A handle may protrude from an outer surface of the container, and the air vent may pass through the outer surface of the container in a direction crossing the handle.

The air vent may be defined by cutting from a lower end of the container to a position lower than a top surface of the body accommodation portion.

INDUSTRIAL APPLICABILITY

Since the blender according to the embodiment of the present invention has improved ease of use and safety, industrial applicability is high.

The invention claimed is:

1. A blender comprising:
a body including a motor assembly;
a container detachably seatable to the body and to accommodate food;
a container seating portion at a top surface of the body and on which the container is seatable;
a body accommodation portion recessed at a bottom surface of the container to receive the container seating portion, and is in contact with the container seating portion when the container is seated at the body;
a lower support portion defining an outer circumferential surface and a lower end of the container; and
an air vent passing through the lower support portion and configured to provide an air passage communicating with the body accommodation portion, and
wherein the air vent is cut from a lower end of the lower support portion to a position lower than a top surface of the body accommodation portion, and
wherein a height of the air vent is higher than an upper end of the container seating portion in a state where the container is seated at the body, so that air flows through the air vent to prevent sealing between the container seating portion and the body accommodation portion.

2. The blender of claim 1, wherein the container includes a container coupling portion protruding downward to insert into the container seating portion, the container coupling portion is defined at a center of the body accommodation portion.

3. The blender of claim 2, comprising a blade module, a lower end of the blade module is exposed at a center of the container coupling portion,
wherein an upper end of the motor assembly that couples to the lower end of the blade module is exposed at a center of the container seating portion, and
when the container is seated at the body, the blade module and the motor assembly are connected to each other.

4. The blender of claim 1, wherein the lower support portion extends further downward than the container coupling portion, and
an outer surface of the lower support portion and an outer surface of the container seating portion form a same plane.

5. The blender of claim 1, wherein the air vent extends upward and becomes narrower upward.

6. The blender of claim 1, wherein the container seating portion comprises:
a first seating portion protruding upward from a top surface of the body and having an outer diameter corresponding to an outer diameter of the container; and
a second seating portion protruding upward from a top surface of the first seating portion and having an outer diameter less than that of the first seating portion.

7. The blender of claim 6, wherein the lower support portion is supported by the first seating portion, and
a space into which the container coupling portion is received is defined at the second seating portion.

8. The blender of claim 6, wherein the air vent extends to a position higher than an upper end of the second seating portion in a state where the container is seated on the body.

9. The blender of claim 1, wherein the container comprises:
an outer container defining an outer appearance; and
an inner container spaced apart from the outer container and defining a space in which food is accommodated,
wherein the lower support portion is formed by extending a lower end of the outer container.

10. The blender of claim 2, comprising a plurality of coupling guides protruding outward at intervals around the container coupling portion, and
wherein the container seating portion comprises:
coupling support portions supporting an outer surface of the container coupling portion and spaced apart from each other at intervals; and a guide coupling groove into which the coupling guide is received, the guide coupling groove defined between two coupling support portions spaced apart from each other.

11. The blender of claim 10, wherein a top surface of the coupling support portion is inclined or rounded so that both sides of the top surface is lower than a center of the top surface.

12. The blender of claim 1, comprising a handle protruding from an outer surface of the container, and
   the air vent passes through the outer surface of the container along a line that crosses a line along the handle protruding from the outer surface of the container.

* * * * *